(12) United States Patent
Baer (10) Patent No.: US 6,798,450 B2
(45) Date of Patent: Sep. 28, 2004

(54) APPARATUS AND METHOD FOR REDUCING SMEAR IN DIGITAL IMAGES CAPTURED USING FRAME-TRANSFER CCD SENSOR

(75) Inventor: Richard L. Baer, Los Altos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 457 days.

(21) Appl. No.: 09/877,465

(22) Filed: Jun. 8, 2001

(65) Prior Publication Data

US 2002/0186308 A1 Dec. 12, 2002

(51) Int. Cl.[7] .......................... H04N 9/64; H04N 5/217
(52) U.S. Cl. ................. 348/248; 348/249; 348/250
(58) Field of Search ................. 348/207.99, 241, 348/243, 248, 249, 250, 294, 296, 297, 298, 311, 314; 250/208.1

(56) References Cited

U.S. PATENT DOCUMENTS

| | | | |
|---|---|---|---|
| 4,578,707 A | 3/1986 | Ozawa et al. | |
| 4,731,656 A | * 3/1988 | Dischert et al. | 348/249 |
| 4,825,292 A | * 4/1989 | Knibbe | 348/250 |
| 5,883,667 A | 3/1999 | Taniji | |
| 5,896,172 A | * 4/1999 | Korthout et al. | 348/248 |
| 5,963,251 A | 10/1999 | DeLong | |

FOREIGN PATENT DOCUMENTS

EP        0277394 A        8/1988

* cited by examiner

Primary Examiner—Tuan Ho (57) ABSTRACT

An apparatus and method for reducing smear in electronic images utilizes estimated smear signals to remove components in the image signals of the electronic images that are attributable to the smear. The estimated smear signals correspond to the smear components of the image signals. The estimated smear signals are generated by collecting electrical charges in an electronic image sensor after an exposure period. The estimated smear signals may be generated in sequence to the acquisition of the image signals. Alternatively, the estimated smear signals may be generated in parallel to the acquisition of the image signals.

23 Claims, 11 Drawing Sheets

APPARATUS AND METHOD FOR REDUCING SMEAR IN DIGITAL IMAGES CAPTURED USING FRAME-TRANSFER CCD SENSOR

FIELD OF THE INVENTION

The invention relates generally to the field of digital imaging, and more particularly to an apparatus and method for reducing smear in digital images captured using a frame-transfer charge coupled device (CCD) sensor.

BACKGROUND OF THE INVENTION

In contrast to a conventional film camera, a digital camera employs an electronic image sensor to digitally capture a scene of interest. Thus, the electronic image sensor functions as a film for the digital camera. Typically, the electronic image sensor is either a charge coupled device (CCD) sensor or a complementary metal oxide semiconductor (CMOS) sensor. However, due to their higher sensitivity and lower noise characteristics, CCD sensors have been much more widely adopted in applications that require high image quality.

There are a number of different types of CCD sensors, such as frame interline-transfer CCD sensors, interline-transfer CCD sensors, and frame-transfer CCD sensors. The CCD sensors of interest herein are the frame-transfer CCD sensors. A conventional frame-transfer CCD sensor for use in digital photography includes a CCD array of pixel regions and a serial register. The CCD array includes an image area and a storage area. The pixel regions of the CCD array are defined by isolation implants and gate electrodes, which extend perpendicular to each other. The CCD array is used to accumulate electronic charges within the pixel regions in response to impinging illumination and to transfer the accumulated charges to the serial register for readout. However, the storage area of the CCD array is covered with an opaque mask to prevent photon-induced accumulation of charges. Thus, the storage area is exclusively used to transfer the accumulated charges in the image area to the serial register for readout. The storage area allows the accumulated charges in the image area to be rapidly removed from exposure to illumination.

A digital camera with a conventional frame-transfer CCD sensor digitally captures images in the following manner. First, the image area of the CCD array is cleared of existing charges, which begins an exposure period. During the exposure period, charges are accumulated in the pixel regions of the image area in response to impinging light. At the end of the exposure period, the accumulated charges in the image area are rapidly transferred to the storage area of the CCD array. The transferred charges are then readout through the serial register on a row-by-row basis in a relatively slow fashion.

Typically, a digital camera operates in either a still-capture mode or a video mode. The still-capture mode is used to capture still images of scenes of interest. The video mode is used to acquire information for exposure control and focus control. In addition, the video mode is used to provide a user with a real time preview of the final image.

In the still-capture mode, a mechanical shutter of the digital camera is used to end the exposure period. The mechanical shutter prevents further accumulation of charges in the image area of the CCD array. However, in the video mode, the high frame rate makes the use of the mechanical shutter impractical. Thus, the mechanical shutter is not used during the video mode. As a result, photon-induced charges may continue to accumulate even after the exposure period when the accumulated charges are being transferred from the image area of the CCD array to the storage area of the CCD array. The additional accumulation of charges may result in the appearance of "smear" in the captured images. The relative magnitude of the "smear charge" is inversely proportional to the ratio of the exposure period to the period required to shift the accumulated charges by one row (the horizontal line period) to transfer the accumulated charges to the storage area of the CCD array. Smear is most noticeable when the exposure period is short and the illumination is strong. Smear can be reduced by increasing the speed of the frame shift rate, i.e., the vertical transfer rate of charges from the image area of the CCD array to the storage area of the CCD array. However, the frame shift rate is limited to about 1 MHz in current frame-transfer CCD sensors by the RC time-constant of the gate electrodes. Thus, the appearance of smear is still a significant issue for digital images captured using a conventional frame-transfer CCD sensor.

In view of the above-described problem, there is a need for an apparatus and method for reducing smear in electronically captured images using a frame-transfer CCD sensor.

SUMMARY OF THE INVENTION

An apparatus and method for reducing smear in electronic images utilizes estimated smear signals to remove components in the image signals of the electronic images that are attributable to the smear. The estimated smear signals correspond to the smear components of the image signals. The estimated smear signals are generated by collecting electrical charges in an electronic image sensor after an exposure period. The estimated smear signals may be generated in sequence to the acquisition of the image signals. Alternatively, the estimated smear signals may be generated in parallel to the acquisition of the image signals.

A method for reducing smear in images captured using an electronic image sensor in accordance with the invention includes the steps of generating image signals, some of which include image and smear components, and generating estimated smear signals, which are based on electrical charges accumulated in the electronic image sensor. The image signals represent an electronic image of a scene of interest. The image components of the image signals correspond to electrical charges collected in the electronic image sensor during an exposure period. The smear components of the image signals correspond to electrical charges collected in the electronic image sensor after the exposure period. The smear signals represent the smear components of the image signals. The method further includes the step of substantially removing the smear components from the image signals using the estimated smear signals to reduce smear in the electronic image.

The step of generating the image signals may include collecting electrical charges in the electronic image sensor from the start of an exposure period. Furthermore, the step of generating the estimated smear signals may include collecting electrical charges in the electronic image sensor from the end of an exposure period. In an embodiment, the step of generating the estimated smear signals and the step of generating the image signals are executed in sequence.

In another embodiment, the step of generating the estimated smear signals and the step of generating the image signals are executed in parallel. In this embodiment, the step of generating the estimated smear signals may include collecting electrical charges in selected portions of the electronic image sensor from the end of an exposure period to acquire sample smear signals. The selected portions of the electronic image sensor may be selected photosensitive pixel rows of the image sensor. In this embodiment, the method may further include a step of interpolating the sample smear signals from adjacent rows of the selected photosensitive pixel rows to derive the estimated smear signals.

An apparatus in accordance with the invention includes an electronic image sensor having an array of photosensitive pixels and a smear cancellation unit. The electronic image sensor is configured to generate image signals that represent an electronic image of a scene of interest. The electronic image sensor may include a charge coupled device. Some of the image signals generated by the electronic image sensor include image components and smear components. The image components of the image signals correspond to electrical charges collected in the electronic image sensor during an exposure period. The smear components of the image signals correspond to electrical charges collected in the electronic image sensor after the exposure period. The electronic image sensor is further configured to generate sample smear signals that represent the smear components of the image signals. The smear cancellation unit of the apparatus is configured to substantially remove the smear components from the image signals using the sample smear signals to reduce smear in the electronic image.

In an embodiment, the electronic image sensor is configured to generate a set of the image signals and a set of the sample smear signals in sequence. In this embodiment, the smear cancellation unit includes a subtraction unit that subtracts the image signals by the sample smear signals to substantially remove the smear components from the image signals.

In another embodiment, the electronic image sensor is configured to generate the image signals and the sample smear signals in parallel. In this embodiment, the electronic image sensor includes selected photosensitive pixels that are configured to exclusively generate the sample smear signals. The selected photosensitive pixels may be located on selected pixel rows of the electronic image sensor. In this embodiment, the smear cancellation unit may include an interpolation unit that generates estimated smear signals from the sample smear signals from adjacent pixel rows of the selected pixel rows of the electronic image sensor. The smear cancellation unit may also include a subtraction unit that subtracts the image signals associated with pixel rows of the electronic image sensor that are positioned between the adjacent pixel rows of the electronic sensor by the estimated smear signals to substantially remove the smear components from the image signals.

Other aspects of the present invention will become apparent from the following detailed description, taken in conjunction with the accompanying drawings, illustrated by way of example of the principles of the invention.

DETAILED DESCRIPTION

Figure 1:
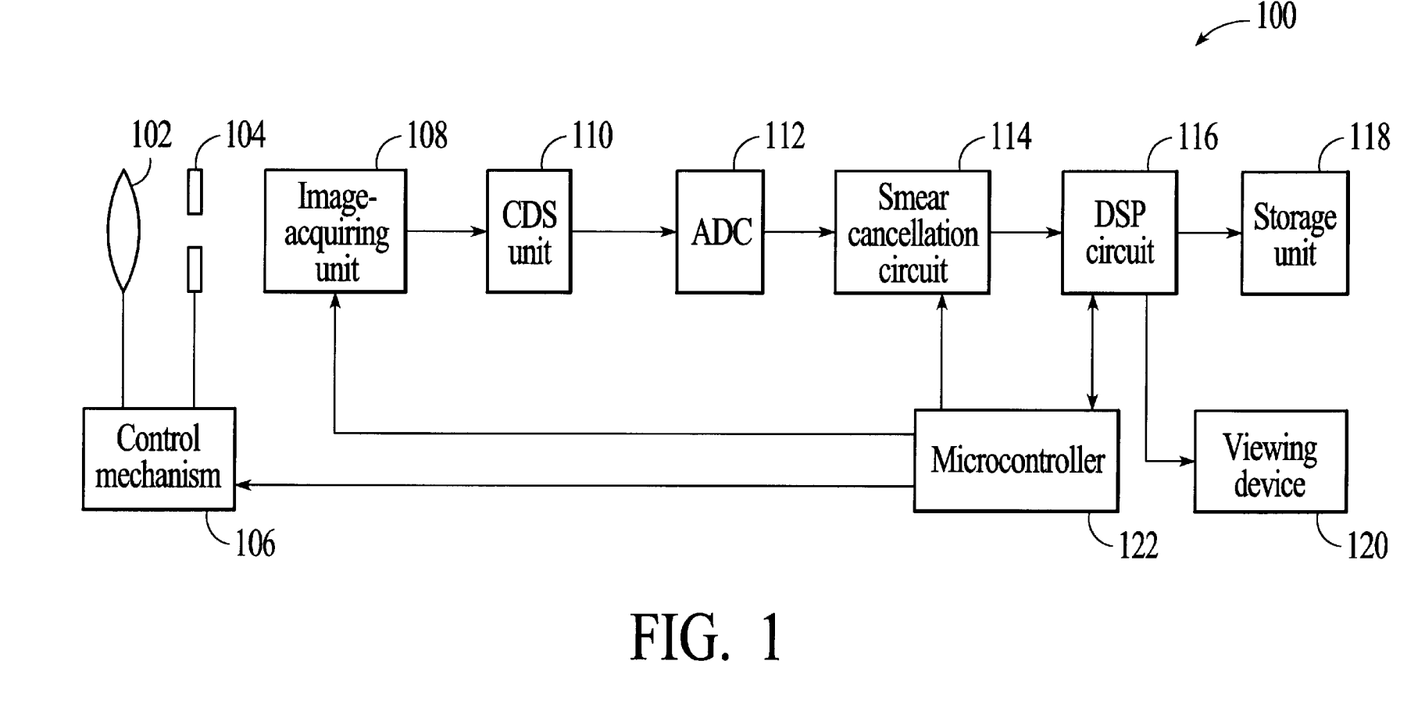
FIG. 1 is a block diagram of a digital imaging apparatus in accordance with a first embodiment the present invention.

With reference to FIG. 1, a digital imaging apparatus 100 in accordance with a first embodiment of the present invention is shown. The digital imaging apparatus utilizes a frame-transfer charge coupled device (CCD) sensor to electronically capture image signals in the form of accumulated charges that represent electronic images of scenes of interest. The digital imaging apparatus operates to cancel smear components of the captured image signals during video mode operation to provide substantially smear-free video frames for preview and auto-focus.

The digital imaging apparatus 100 includes a lens 102 and a mechanical shutter 104 that are connected to a control mechanism 106, as shown in FIG. 1. The control mechanism operates to adjust the lens in order to focus a scene of interest. In addition, the control mechanism operates to open and close the mechanical shutter to control integration or exposure periods to capture still images. The digital imaging apparatus further includes an image-acquiring unit 108, a correlated double sampling (CDS) unit 110, an analog-to-digital converter (ADC) 112, a smear cancellation circuit 114, a digital signal processing (DSP) circuit 116, a storage unit 118, a viewing device 120 and a microcontroller 122.

The image-acquiring unit 108 of the digital imaging apparatus 100 generates image signals to capture electronic images of scenes of interest. In still-capture mode, the electronic images are individual still pictures. In video mode, the electronic images are video frames. The image-acquiring unit then serially outputs the image signals for processing. As described in detail below, the image-acquiring unit also generates smear signals, which are used to cancel smear components of the image signals during video mode operation.

Figure 2:
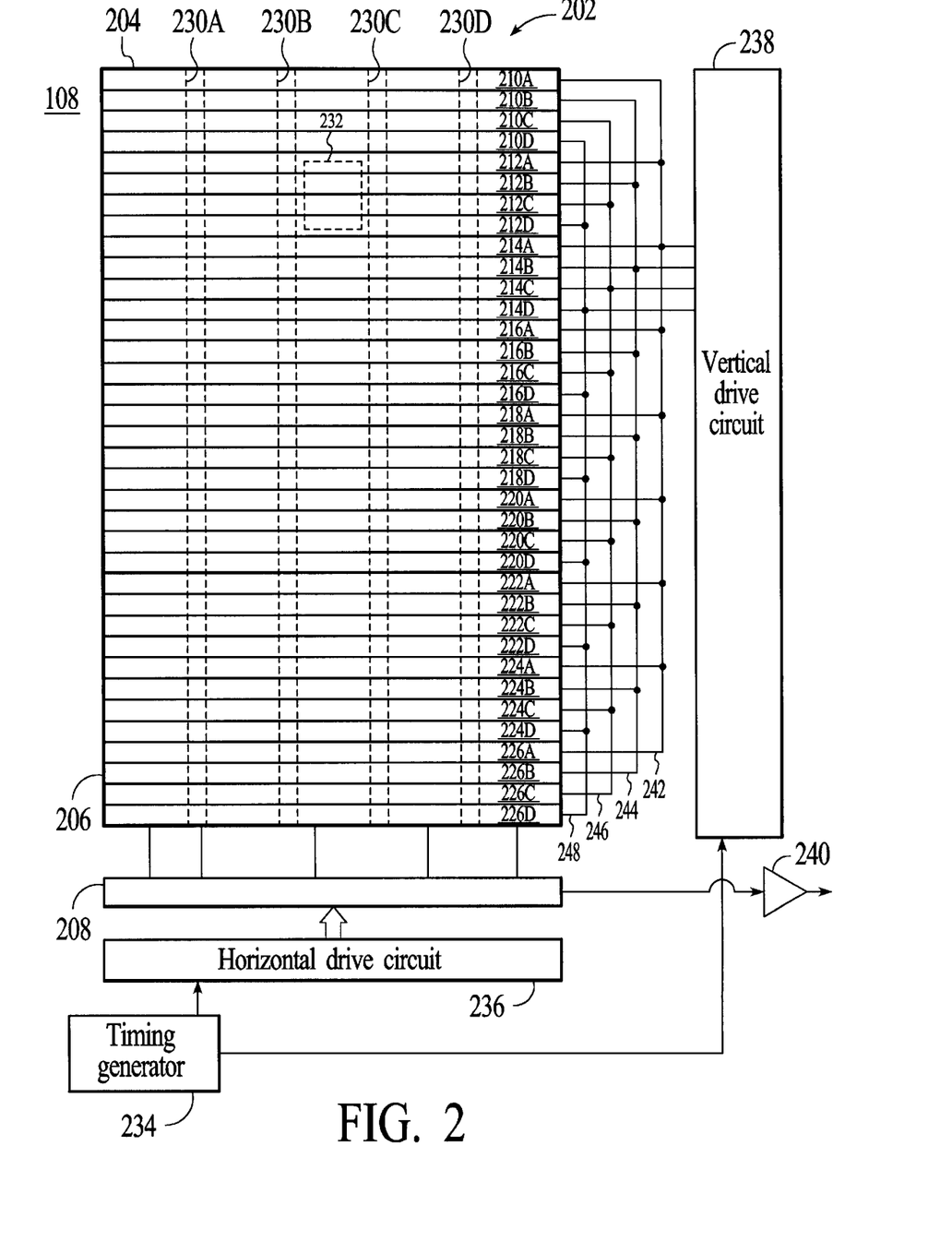
FIG. 2 is a block diagram of an image-acquiring unit of the digital imaging apparatus in accordance with the first embodiment.

Turning to FIG. 2, a block diagram of the image-acquiring unit 108 of the digital imaging apparatus 100 is shown. As illustrated in FIG. 2, the image-acquiring unit includes a CCD sensor 202, which is configured in accordance to a frame-transfer CCD architecture. The CCD sensor includes an image area 204, a storage area 206 and a serial register 208. The image area and the storage area of the CCD sensor are structurally similar. However, the storage area is masked with an opaque shield. Thus, only the image area is exposed to illumination when the mechanical shutter 104 is opened. The storage area may have a reduced-height as compared to the image area. However, the width of the storage area is the same as the image area.

The CCD image and storage areas 204 and 206 include parallel gate electrodes 210, 212, 214, 216, 218, 220, 222, 224 and 226, and parallel isolation implants 230. In the exemplary embodiment, the gate electrodes are formed of poly-Si and the isolating implants are p+ regions. The parallel gate electrodes extend horizontally, while the parallel isolation implants extend vertically. Although only a small number of gate electrodes and isolation implants are shown in FIG. 2, the CCD image and storage areas includes additional gate electrodes and isolation implants. The gate electrodes and the isolation implants define photosensitive pixels, as illustrated by a photosensitive pixel 232. In this exemplary embodiment, the pixel 232 is a section of the CCD sensor 202 defined by the isolation implants 230B and 230C and the four gate electrodes 212A, 212B, 212C and 212D. The number of gate electrodes included in a photosensitive pixel is indicative of the charge transport phase scheme of a frame-transfer CCD sensor. Consequently, the CCD sensor 202 utilizes four-phase charge transport scheme. However, the CCD sensor may utilize different charge transport scheme, such as a bi-phase or three-phase charge transport scheme. In these alternative schemes, the photosensitive pixels of the CCD sensor are defined by number of gate electrodes that corresponds to the number of phases for charge transport. In the exemplary embodiment, four gate electrodes define photosensitive pixels of the CCD sensor. Thus, each set of four gate electrodes 210, 212, 214, 216, 218, 220, 222, 224 and 226 corresponds to a photosensitive pixel row of the CCD sensor. For example, the four gate electrodes 210A, 210B, 210C and 210D correspond to a single photosensitive pixel row of the CCD sensor.

The image-acquiring unit 108 further includes a timing generator 234, a horizontal drive circuit 236, a vertical drive circuit 238 and an amplifier 240. The timing generator provides timing signals to the horizontal and vertical drive circuits. In response to the timing signals, the vertical drive circuit supplies gate voltages to the gate electrodes 210, 212, 214, 216, 218, 220, 222, 224 and 226 in both the image area 204 and the storage area 206 of the CCD sensor 202 through four common electrical lines 242, 244, 246 and 248. As illustrated in FIG. 2, each gate electrode of the CCD sensor is connected to one of the four common electrical lines that are connected to the vertical drive circuit 238. The gate electrodes 210A, 212A, 214A, 216A, 218A, 220A, 222A, 224A and 226A are connected to the electrical line 242. The gate electrodes 210B, 212B, 214B, 216B, 218B, 220B, 222B, 224B and 226B are connected to the electrical line 244. The gate electrodes 210C, 212C, 214C, 216C, 218C, 220C, 222C, 224C and 226C are connected to the electrical line 246. Similarly, the gate electrodes 210D, 212D, 214D, 216D, 218D, 220D, 222D, 224D and 226D are connected to the electrical line 248. Thus, every fourth gate electrodes are connected to the same electrical line. For simplification, other conventional components commonly found in a frame-transfer CCD sensor device are not shown or described herein.

During an exposure period, the vertical drive circuit 238 supplies high voltages to the gate electrodes 210B, 210C, 212B, 212C, 214B, 214C, 216B, 216C, 218B, 218C, 220B, 220C, 222B, 222C, 224B, 224C, 226B and 226C, creating potential wells in the photosensitive pixels of the CCD sensor 202. Since only the image area 204 of the CCD sensor is exposed to illumination, only the photosensitive pixels of the image area accumulate charges in response to the impinging illumination. After the exposure period, the vertical drive circuit 238 supplies voltages to all the gate electrodes in phases to vertically transfer the accumulated charges from the image area 204 to the serial register 208 through the storage area 206 of the CCD sensor. Four-phase charge transport scheme is well known in the field of digital imaging and thus, is not described herein. Initially, the accumulated charges are rapidly transferred to the storage area. The transferred charges are then serially readout though the serial register on a row-by-row basis as analog image signals. The voltages needed by the serial register to serially readout a row of accumulated charges are supplied by the horizontal drive circuit 236. In the exemplary embodiment, the vertical drive circuit supplies either 0 or 12 volts and the horizontal drive circuit supplies either 0 or 5 volts. The analog image signals from the serial register are then amplified by the amplifier 240 and transmitted to the CDS unit 110.

In still-capture mode, the mechanical shutter 104 is closed at the end of the exposure period. Thus, the mechanical shutter prevents further photon-induced accumulation of charges in the image area 204 of the CCD sensor 202. However, in video mode, the mechanical shutter is not used. This is mainly due to the power that would be consumed and the accelerated wear which the shutter would experience in video operation. Thus, during video mode, the image area of the CCD sensor is not protected from illumination. Consequently, as the accumulated charges are being transferred from the image area 204 to the storage area 206, some of the charges that have been accumulated during the exposure period are contaminated with additional photon-induced charges. These additional photon-induced charges are referred herein as "smear charges". The effect of these smear charges is the appearance of smear in the resulting image, especially if there is a bright region in the captured scene, such as a strong light source. Smear degrades the quality of the preview images that are provided to the user. Furthermore, smear can cause the digital imaging apparatus 100 to focus at the wrong distance. Thus, smear presents a serious problem for the digital imaging apparatus during video operation.

The digital imaging apparatus 100 resolves the smear problem by substantially canceling the smear components of the image signals, i.e., the smear charges included in the final image charges. For each captured electronic image, the image-acquiring unit 108 subsequently acquires charges using an exposure period of zero. Since the exposure period is zero, these acquired charges are exclusively due to the accumulation of charges after the exposure period, which are equivalent to the smear charges included in the image charges for that captured electronic image. These subsequent charges, which are sometimes also referred herein as "smear charges", are then used to cancel the smear components of the image signals.

Figure 3:
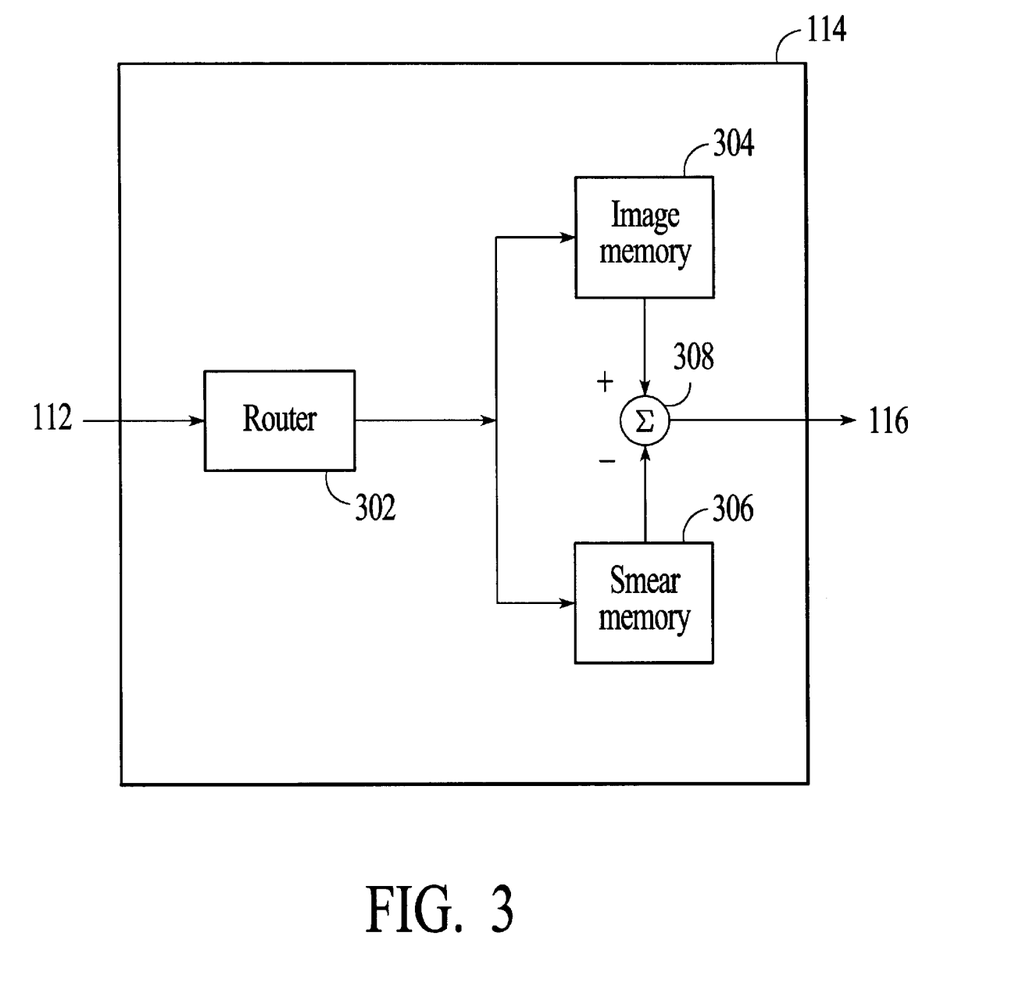
FIG. 3 is a block diagram of a smear cancellation circuit of the digital imaging apparatus in accordance with the first embodiment.

Turning back to FIG. 1, other components of the digital imaging apparatus 100 are now described. The CDS unit 110 operates to reduce noises contained in the analog signals from the image-acquiring unit 108, i.e., the accumulated charges. The noise-reduced signals are then transmitted to the ADC 112. The ADC converts the noise-reduced signals from analog signals to digital signals. The digital signals are then received by the smear cancellation circuit 114, where smear components of the digital image signals are removed by using the digital signals from the smear charges, which are accumulated using an exposure period of zero. As shown in FIG. 3, the smear cancellation circuit 114 includes a router 302, an image memory 304, a smear memory 306 and a subtraction unit 308. The router directs digital signals from the ADC 112 to either the image memory or the smear memory. The digital signals of the charges accumulated during a normal exposure period, i.e., the image charges, are routed to the image memory. These digital signals of the image charges are referred herein as digital image signals. The digital signals of the charges accumulated during the zero exposure period, i.e., the smear charges, are routed to the smear memory. These digital signals of the smear charges are referred herein as digital smear signals. The subtraction unit 308 of the smear cancellation circuit removes the smear components of the digital image signals by subtracting the digital image signals by the digital smear signals. The resulting image signals are then transferred to the DSP circuit 116. Although the smear cancellation circuit is shown in FIG. 1 as an independent component, the smear cancellation may instead be incorporated into the DSP circuit.

The DSP circuit 116 of the digital imaging apparatus 100 operates to demosaic the smear-canceled image signals. In addition, the DSP circuit may perform one or more image processing techniques to enhance the captured image. The captured image may then be displayed on the viewing device 120 and/or be stored in the storage unit 118. As an example, the viewing device may be an LCD display and the storage unit may be a flash memory. The captured image may also be used by the microcontroller 122 to auto-focus the lens 102 using the control mechanism 106. The microcontroller controls various components of the digital imaging apparatus, including the image-acquiring unit 108 and the smear cancellation circuit 114.

Figure 4:
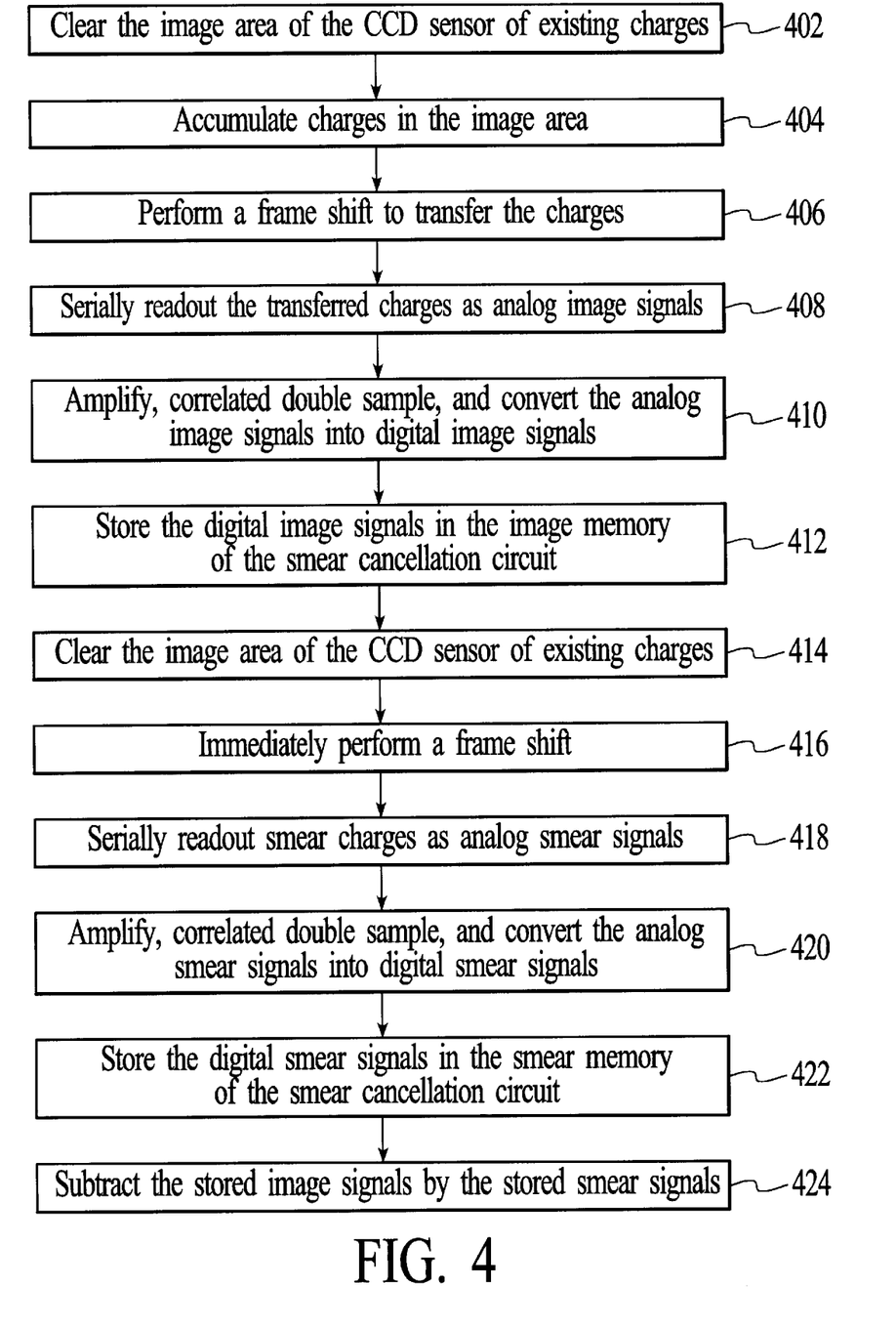
FIG. 4 is a flow diagram of the operation of the digital imaging apparatus in accordance with the first embodiment.

The operation of the digital imaging apparatus 100 is described with reference to FIG. 4. At step 402, the image area 204 of the CCD sensor 202 is cleared of existing charges, which begins the exposure period. The image area may be cleared by momentarily setting the voltage on the gate electrodes 210, 212, 214, 216, 218 and 220 of the image area to 0 volts. Next, at step 404, charges are accumulated in the image area in response to impinging illumination until the end of the exposure period. The accumulated charges represent an electronic image of a scene of interest. At step 406, a frame shift is performed on the CCD sensor to transfer the accumulated charges from the image area 204 of the CCD sensor to the storage area 206 of the CCD sensor, during which the accumulated charges may become contaminated with smear charges. The resulting charges are then readout of the CCD sensor through the serial register 208 on a row-by-row basis as analog image signal, at step 408. Next, at step 410, the analog image signals are amplified, correlated double sampled, and converted into digital image signals. At step 412, the digital image signals are stored in the image memory 304 of the smear cancellation circuit 114. Thus, image signals with smear components are acquired and stored.

Next, smear signals that correspond to the smear components of the image are acquired. At step 414, the image area 204 of the CCD sensor 202 is again cleared of existing charges. After the clearing of the image area, a frame shift is immediately performed on the CCD sensor, at step 416. Thus, the exposure period for acquiring the smear signals is zero. Consequently, the resulting charges are attributable to accumulation of charges after the exposure period, which are the smear charges. The resulting charges are then readout of the CCD sensor through the serial register on a row-by-row basis as analog smear signal, at step 418. Next, at step 420, the analog smear signals are amplified, correlated double sampled, and converted into digital smear signals. At step 422, the digital smear signals are stored in the smear memory 306 of the smear cancellation circuit 114.

Next, at step 424, the stored image signals are subtracted by the stored smear signals by the subtraction unit 308 of the smear cancellation circuit 114 to remove the smear components of the image signals. Since the smear signals are substantially equivalent to the smear components of the image signals, the subtraction of the digital signals by the smear signals effectively cancels the smear components of the image signals. The smear-canceled image signals produce virtually smear-free video frame, which can be used to auto-focus the lens 102 of the digital imaging apparatus 100 and/or to provide a preview image on the viewing device 120.

Figure 5:
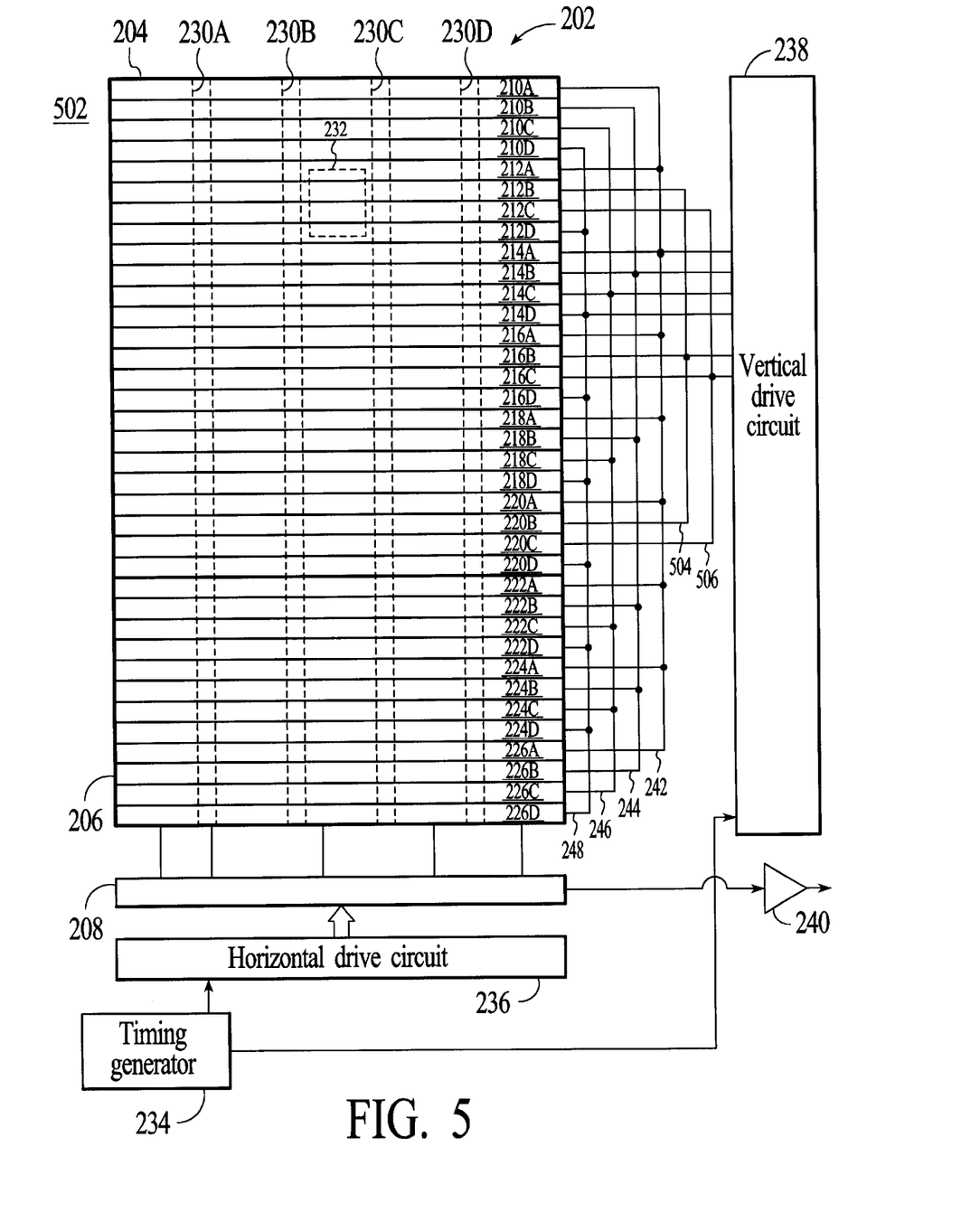
FIG. 5 is a block diagram of an image-acquiring unit of the digital imaging apparatus in accordance with a second embodiment of the present invention.
Figure 6:
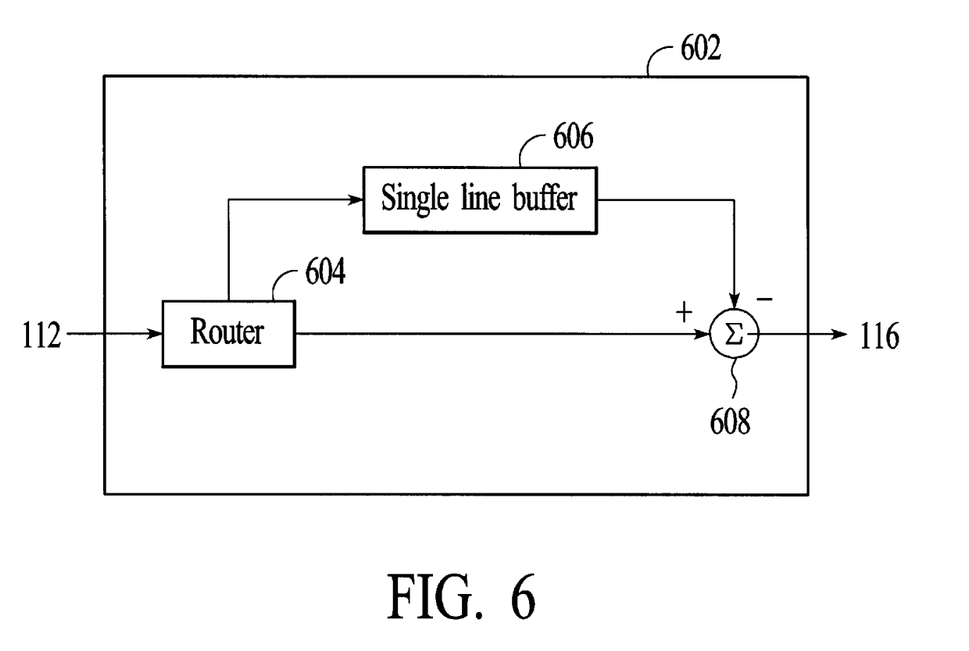
FIG. 6 is a block diagram of a smear cancellation circuit of the digital imaging apparatus in accordance with the second embodiment.

In a second embodiment, the digital imaging apparatus 100 utilizes an image-acquiring unit 502 and a smear cancellation circuit 602 that differ from the image-acquiring unit 108 and the smear cancellation circuit 114, as illustrated in FIGS. 5 and 6. Similar to the digital imaging apparatus of the first embodiment, the digital imaging apparatus of the second embodiment also reduces smear in captured electronic images by canceling smear components of the image signals. However, in this second embodiment, the image signals and the smear signals are acquired in parallel, rather than in sequence. That is, the image and smear signals are acquired using a single exposure period. The operation of the digital image apparatus of the second embodiment is described in detail below.

As illustrated in FIG. 5, the image-acquiring unit 502 includes all the components of the image-acquiring unit 108 of FIG. 2. The image-acquiring unit 502 includes the CCD sensor 202, the horizontal drive circuit 236, the vertical drive circuit 238, the timing generator 234 and the amplifier 240. However, the CCD sensor 202 of the image-acquiring unit 502 is configured such that every other photosensitive pixel row in the image area 202 of the CCD sensor 202 is dedicated to acquiring smear signals. Thus, the photosensitive pixel rows that correspond to the gate electrodes 212, 216 and 220 are dedicated to acquiring smear signals. These rows are referred herein as smear rows. The remaining rows in the image area that correspond to the gate electrodes 210, 214 and 218 are dedicated to acquiring image signals. These rows are referred herein as image rows.

The image and smear rows of the CCD sensor 202 are structurally identical. However, the gate electrodes 210, 214 and 218 of the image rows are connected to different electrical lines from the vertical drive circuit 238 than the gate electrodes 212, 216 and 220 of the smear rows. The four gate electrodes of each image row are connected to the electrical lines 242, 244, 246 and 248. The four gate electrodes of each smear row are connected to the electrical lines 242, 248, 504 and 506. Since the electrical lines 242 and 248 are shared by all the rows of the CCD sensor, the image-acquiring unit 502 includes two additional electrical lines 504 and 506 from the vertical drive circuit 238, when compared to the image-acquiring unit 108 of FIG. 2.

During video operation, the image-acquiring unit 502 acquires both image signals and smear signals in the following manner. First, the image area 204 of the CCD sensor 202 is cleared of existing charges. During an exposure period, the vertical drive circuit 238 provides high voltage, e.g., 12 volts, to only the electrical lines 244 and 246. The voltage on the remaining electrical lines 242, 248, 504 and 506 is maintained at 0 volts. Consequently, only the image rows are allowed to accumulate charges. At the end of the exposure period, a frame shift is performed to transfer the accumulated charges from the image area 204 of the CCD sensor to the storage area 206. The frame shift is performed by providing voltages in phases to the gate electrodes of the CCD sensor by the vertical drive circuit 238. During this transfer, smear charges are accumulated in the image area of the CCD sensor. Thus, the accumulated charges from the image rows will be increased by the smear charges. However, since there were no accumulated charges from the smear rows prior to the frame shift, the transferred charges from the smear rows include only the smear charges that were accumulated after the exposure period. The transferred charges in the storage area of the CCD sensor are then serially readout as analog signals through the serial register 208 on a row-by-row basis. Similar to the first embodiment, the analog signals are amplified by the amplifier 240 and transmitted to the CDS unit 110, where the analog signals are noise reduced. The noise-reduced analog signals are then converted to digital signals by the ADC 112 and transmitted to the smear cancellation circuit 602, where smear components of the digital image signals are removed using the digital smear signals.

As shown in FIG. 6, the smear cancellation circuit 602 in accordance with the second embodiment includes a router 604, a single line buffer 606 and a subtracting unit 608. The router is configured to route smear signals from a smear row of the CCD sensor 202 to the single line buffer 606, where the smear signals are temporarily stored. The router is also configured to route image signals from an image row of the CCD sensor to the subtraction unit 608, where the image signals are subtracted by the corresponding smear signals that were stored in the single line buffer. Since the charges from the smear rows and image rows of the CCD sensor are readout on a row-by-row basis, the smear cancellation circuit 602 receives digital smear signals that represent smear charges from an adjacent smear row of the CCD sensor for each image row of the CCD sensor. The smear signals from the adjacent smear row provide signals that approximate the smear components of the image signals for a particular image row of the CCD sensor. Thus, using the smear signals from the adjacent smear row substantially removes the smear components of the image signals. After the smear components have been removed, the smear-canceled image signals are transmitted to the DSP circuit 116 for further processing. Similar to the smear cancellation circuit 114 of FIG. 3, the smear cancellation circuit 602 may be incorporated into the DSP circuit.

Figure 7:
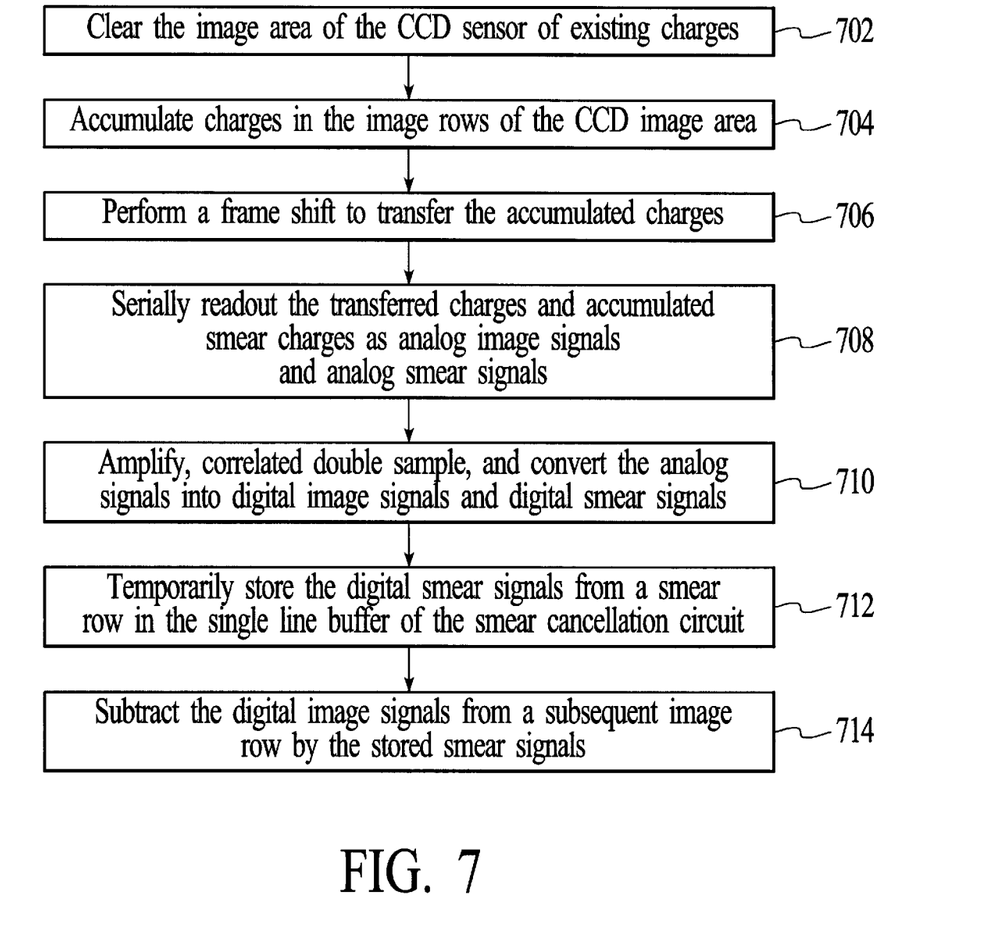
FIG. 7 is a flow diagram of the operation of the digital imaging apparatus in accordance with the second embodiment.

The operation of the digital imaging apparatus 100 in accordance with the second embodiment is described with reference to FIG. 7. At step 702, the image area 204 of the CCD sensor 202 is cleared of existing charges. The image area may be cleared by momentarily setting the voltage on the gate electrodes 210, 212, 214, 216, 218 and 220 of the image area to 0 volts. Next, at step 704, charges are accumulated in the image rows of the image area in response to impinging illumination until the end of the exposure period. The accumulated charges in the photosensitive pixels of the image rows represent an electronic image of a scene of interest. At step 706, a frame shift is performed on the CCD sensor to transfer the accumulated charges from the image area of the CCD sensor to the storage area of the CCD sensor, during which the accumulated charges may be contaminated with additional photon-induced charges, i.e., smear charges. In addition, smear charges also accumulate in the smear rows of the image area as the accumulated charges in the image rows of the CCD sensor are being transferred to the storage area of the CCD sensor. The resulting charges from the image and smear rows are then readout of the CCD sensor through the serial register 208 on a row-by-row basis as analog image signals and analog smear signals, at step 708. Next, at step 710, the analog signals are amplified, correlated double sampled, and converted into digital image signals and digital smear signals.

Next, at step 712, the digital smear signals from a smear row of the CCD sensor are temporarily stored in the single line buffer 606 of the smear cancellation circuit 602. At step 714, the digital image signals from a subsequent image row of the CCD sensor 202 are subtracted by the stored smear signals to derive smear-canceled image signals for that subsequent image row. Steps 712 and 714 are repeated until all the signals from the CCD sensor have been processed.

In an alternative configuration, the image signals from the image rows of the CCD sensor 202 are temporarily stored in the single line buffer 606 of the smear cancellation circuit 602 rather than the smear signals. Thus, in this configuration, the subsequent smear signals from an adjacent smear row of the CCD sensor are used to remove the smear components of the image signals from an image row of the CCD sensor.

Figure 8:
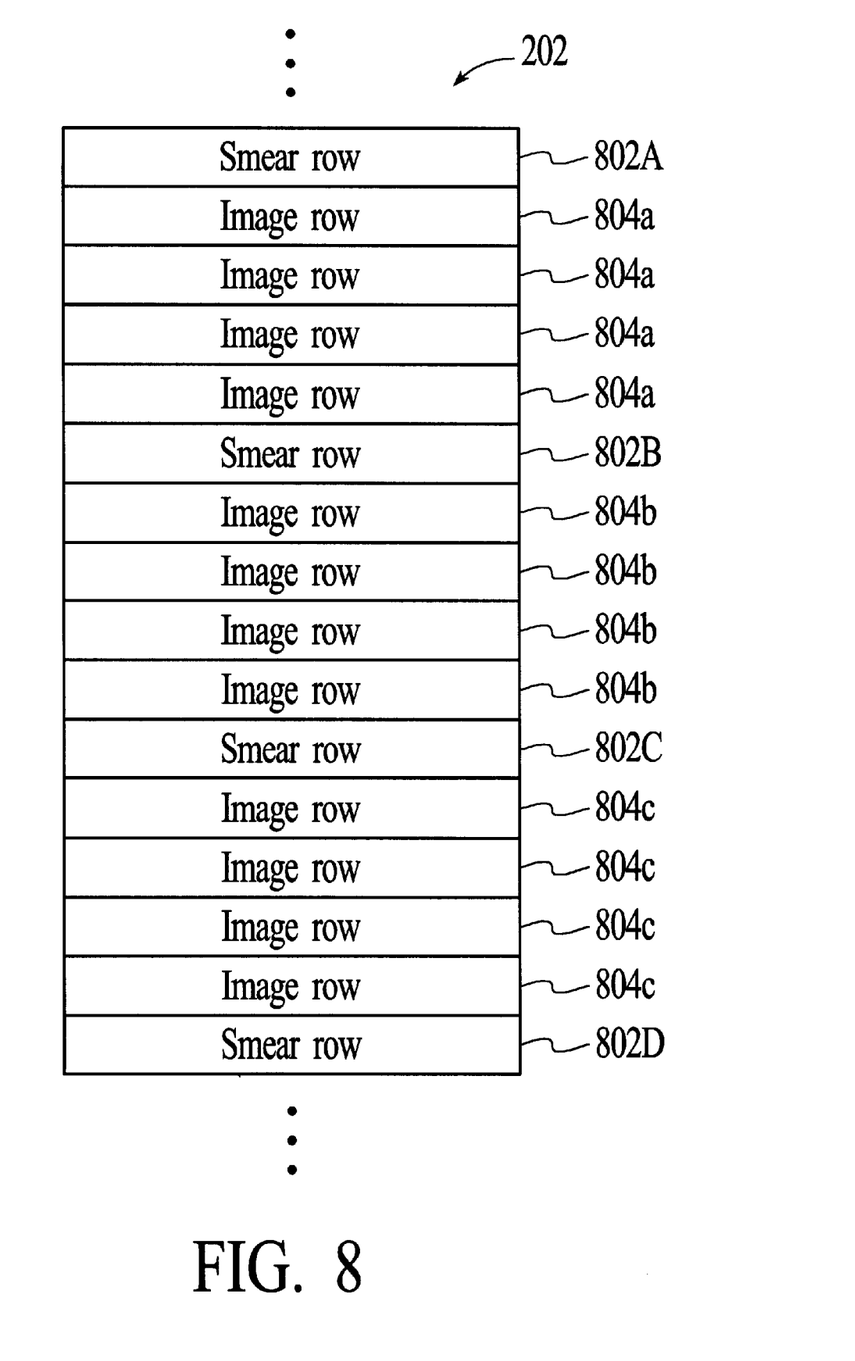
FIG. 8 is an exemplary CCD sensor configuration in accordance with an alternative embodiment.

A concern with the digital imaging apparatus 100 in accordance with the second embodiment is that half of the CCD sensor 202 of the image-acquiring unit 502 is used to acquire smear signals during video operation. Thus, the CCD sensor must be twice as large as a conventional CCD sensor to capture video frames having the same resolution. In an alternative embodiment, the digital imaging apparatus is configured such that the CCD sensor utilizes fewer smear rows. As an example, the image area of the CCD sensor may include a smear row 802 for every four consecutive image rows 804, as illustrated in FIG. 8. In this exemplary embodiment, a pair of adjacent smear rows is used to estimate the smear components of the image signals for the image rows between the two adjacent smear rows. Thus, the smear rows 802A and 802B are used to estimate the smear components of the image signals for the image rows 804a. Similarly, the smear rows 802B and 802C are used to estimate the smear components of the image signals for the image rows 804b, while the smear rows 802C and 802D are used to estimate the smear components of the image signals for the image rows 804c.

Figure 9:
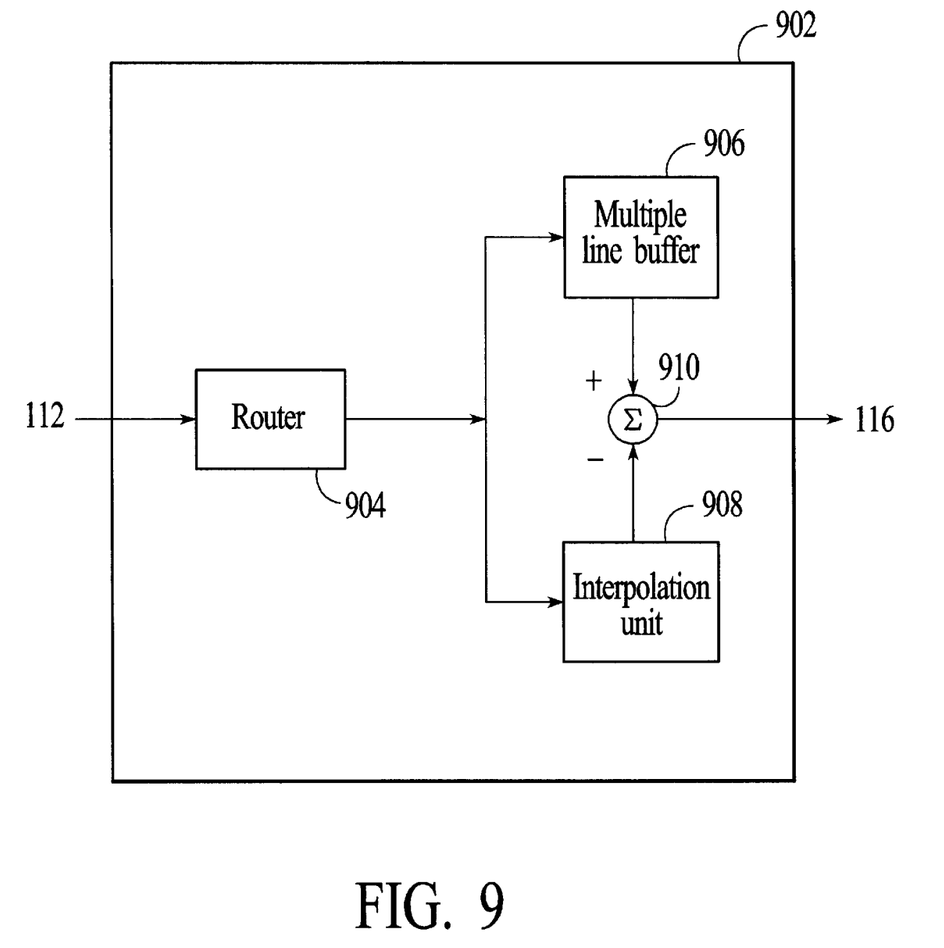
FIG. 9 is a block diagram of a smear cancellation circuit of the digital imaging apparatus in accordance with the alternative embodiment.

In the alternative embodiment, the digital imaging apparatus 100 includes a smear cancellation circuit 902, which is shown FIG. 9. The smear cancellation circuit 902 comprises a router 904, a multiple line buffer 906, an interpolation unit 908 and a subtraction unit 910. The router operates to direct the digital signals from the ADC 112 to either the interpolation unit 908 or the multiple line buffer 906, depending on whether the signals are image signals or smear signals. The smear signals from two adjacent smear rows of the CCD sensor 202, e.g., the smear rows 802A and 802B, are routed to the interpolation unit 908, while the image signals from the image rows of the CCD sensor between the two adjacent smear rows, e.g., the image rows 804a, are routed to the multiple line buffer 906. The interpolation unit then interpolates the smear signals from the two adjacent smear rows to derive estimated smear signals that represent the smear components of the image signals from the image rows between the two adjacent smear rows. In one approach, the estimated smear signals may be the average of two corresponding smear signals from the adjacent smear rows. Thus, in this approach, the same estimated smear signals are used for each of the image signals from the image rows between the adjacent smear rows. In another approach, the estimated smear signals are generated for each image signal from the image rows between the adjacent smear rows. In this approach, two corresponding smear signals are interpolated to generate four different estimated smear signals. As an example, the four estimated smear signals may fall along a straight line defined by the two corresponding smear signals.

The estimated smear signals and the image signals from the image rows between the two adjacent smear rows are then transmitted to the subtraction unit 910 of the smear cancellation circuit 902, where the image signals are subtracted by the estimated smear signals to cancel the smear components of the image signals. The smear-canceled image signals are then transmitted to the DSP circuit 116 for further processing.

Figure 10:
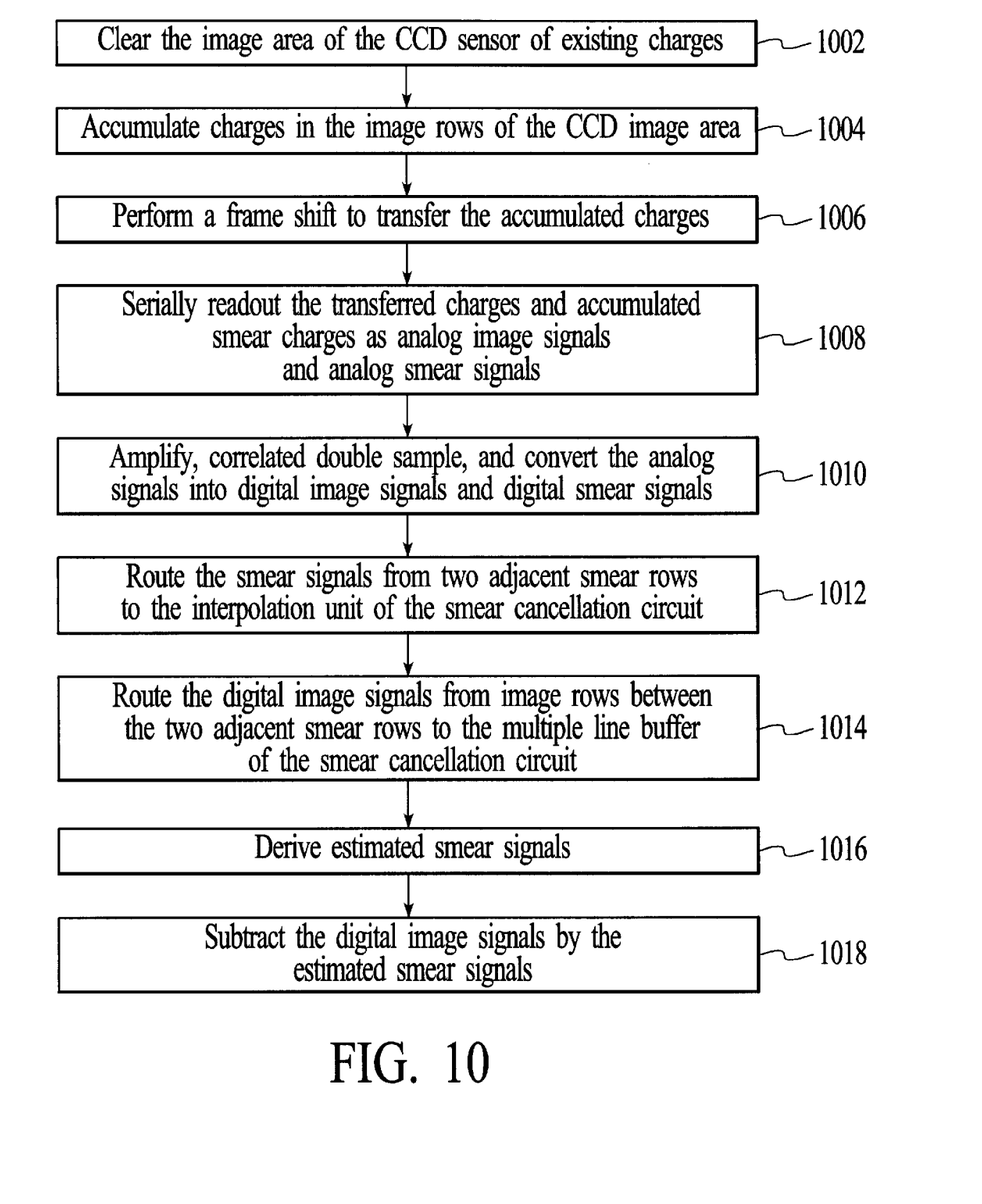
FIG. 10 is a flow diagram of the operation of the digital imaging apparatus in accordance with the alternative embodiment.

The operation of the digital imaging apparatus 100 in accordance with the alternative embodiment is described with reference to FIG. 10. At step 1002, the image area 204 of the CCD sensor 202 is cleared of existing charges. The image area may be cleared by momentarily setting the voltage on the gate electrodes of the image area to 0 volts. Next, at step 1004, charges are accumulated in the image rows of the image area in response to impinging illumination until the end of the exposure period. The accumulated charges represent an electronic image of a scene of interest. At step 1006, a frame shift is performed on the CCD sensor to transfer the accumulated charges from the image area of the CCD sensor to the storage area 206 of the CCD sensor, during which the accumulated charges may be contaminated with additional photon-induced charges, i.e., smear charges. In addition, smear charges also accumulate in the smear rows of the image area as the accumulated charges in the image area of the CCD sensor are being transferred to the storage area of the CCD sensor. The resulting charges from the image and smear rows are then readout of the CCD sensor through the serial register 208 on a row-by-row basis as analog image signals and analog smear signals, at step 1008. Next, at step 1010, the analog signals are amplified, correlated double sampled, and converted into digital image signals and digital smear signals.

Next, at step 1012, the digital smear signals from two adjacent smear rows of the CCD sensor 202 are routed to the interpolation unit 908 of the smear cancellation circuit 902. At step 1014, the digital image signals from the image rows of the CCD sensor between the two adjacent smear rows are routed to the multiple line buffer 906 of the smear cancellation circuit 902. At step 1016, the estimated smear signals are derived by either interpolating or averaging the smear signals. At step 1018, the digital image signals are subtracted by the estimated smear signals to derive smear-canceled image signals. Steps 1012–1018 are repeated until all the signals from the CCD sensor 202 have been processed.

Figure 11:
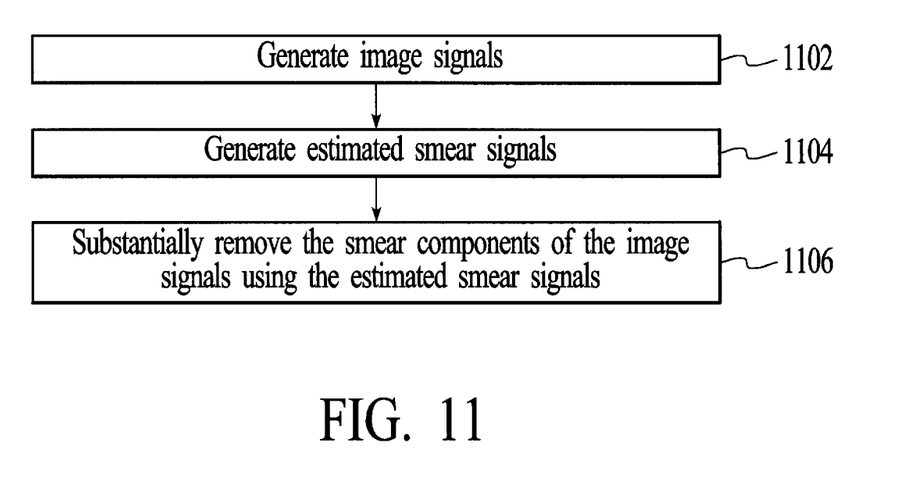
FIG. 11 is a flow diagram of a method of reducing smear in accordance with the invention.

A method of reducing smear in images captured using a frame-transfer CCD sensor is described with reference to FIG. 11. At step 1102, image signals that represent an image of a scene of interest are generated. The image signals include image components and smear components. The image components correspond to electrical charges collected in the CCD sensor during an exposure period, while the smear components correspond to electrical charges collected in the CCD sensor after the exposure period. Next, at step 1104, estimated smear signals that represent the smear components of the image signals are generated. The estimated smear signals are based on electrical charges accumulated in the CCD sensor after an exposure period. At step 1106, the smear components of the image signals are substantially removed using the estimated smear signals.

What is claimed is:

1. A method of reducing smear in images captured using an electronic image sensor comprising:

acquiring image signals that represent an electronic image of a scene of interest using first photosensitive pixels of an image acquiring unit, some of said image signals including image components and smear components, said image components corresponding to electrical charges collected in an image acquiring unit during an exposure period, said smear components corresponding to electrical charges collected in said image acquiring unit after said exposure period;

acquiring estimated signals corresponding to said smear components of said image signals using second photosensitive pixels of said image acquiring unit, said signals being based on electrical charges accumulated in said image acquiring unit; and substantially removing said smear components from said image signals using said estimated signals to reduce smear in said electronic image.

2. The method of claim 1 wherein said step of acquiring said image signals includes collecting electrical charges in an electronic image sensor of said image acquiring unit from the start of an exposure period, and wherein said step of acquiring estimated signals corresponding to said smear components includes collecting electrical charges in said electronic image sensor from the end of an exposure period.

3. The method of claim 2 wherein said step of generating said estimated smear signals and said step of generating said image signals are executed in sequence.

4. The method of claim 2 wherein said step of acquiring estimated signals corresponding to said smear components and said step of acquiring said image signals are executed in parallel.

5. The method of claim 4 wherein said step of acquiring estimated signals corresponding to said smear components includes collecting electrical charges in selected portions of said electronic image sensor from the end of an exposure period to acquire sample smear signals.

6. The method of claim 5 wherein said step of collecting said elcetrical charges in said selected portions of said electronic image sensor includes collecting said electrical charges in selected photosensitive pixel rows of said electronic image sensor.

7. The method of claim 6 further comprising a step of interpolating said sample smear signals from adjacent pixel rows of said selected photosensitive pixel rows of said electronic image sensor to derive estimated smear signals.

8. The method of claim 7 wherein said step of substantially removing said smear components of said image signals includes subtracting said image signals associated with photosensitive pixel rows of said electronic image sensor that are positioned between said adjacent pixel rows of said electronic image sensor by said estimated smear signals.

9. The method of claim 5 wherein said step of acquiring estimated signals corresponding to said smear components includes collecting electrical charges in every other photosensitive pixel row of said electronic image sensor from the end of an exposure period to acquire said sample smear signals.

10. The method of claim 9 wherein said step of substantially removing said smear components of said image signals includes subtracting said image signals associated with a first photosensitive pixel row of said electronic image sensor by estimated smear signals associated with a second photosensitive pixel row of said electronic image sensor, said second photosensitive pixel row being adjacent to said first photosensitive pixel row.

11. An apparatus for reducing smear in electronic images comprising:

an image acquiring unit comprising a charged coupled device (CCD) image sensor having an array of first photosensitive pixels and second photosensitive pixels, said first photosensitive pixels being configured to exclusively generate image signals that represent an electronic image of a scene of interest, some of said image signals including image components and smear components, said image components corresponding to electrical charges collected during an exposure period, said smear components corresponding to electrical charges collected after said exposure period, said second photosensitive pixels being configured to exclusively generate estimated signals corresponding to said smear components of said image signals, said signals being based on electrical charges accumulated in said image acquiring unit; and a smear cancellation unit operatively coupled to said image acquiring unit to substantially remove said smear components from said image signals using said estimated signals to reduce smear in said electronic image.

12. The apparatus of claim 11 wherein said second photosensitive pixels of said CCD image sensor are located on selected pixel rows of said CCD image sensor.

13. The apparatus of claim 12 wherein said smear cancellation circuit includes an interpolation unit that generates estimated smear signals from said estimated signals from adjacent pixel rows of said selected pixel rows of said CCD image sensor.

14. The apparatus of claim 13 wherein said smear cancellation unit includes a subtraction unit that subtracts said image signals associated with pixel rows of said CCD image sensor that are positioned between said adjacent pixel rows of said CCD image sensor by said estimated smear signals to substantially remove said smear components from said image signals.

15. An apparatus for reducing smear in electronic images comprising:

an image acquiring unit being configured to generate image signals that represent an electronic image of a scene of interest, some of said image signals including image components and smear components, said image components corresponding to electrical charges collected during an exposure period, said smear components corresponding to electrical charges collects after said exposure period, said image acquiring unit being configured to obtain estimated signals corresponding to said smear components of said image signals, said signals being based on electrical charges accumulated in said image acquiring unit, said image acquiring unit including photosensitive pixel rows; and smear cancellation unit operatively coupled to said image acquiring unit to substantially remove said smear components from said image signals using said estimated signals to reduce smear in said electronic image, said smear cancellation unit including an interpolation unit that generates estimated smear signals from said estimated signals from adjacent pixel rows of selected photosensitive pixel rows of said image acquiring unit.

16. The apparatus of claim 15 wherein said smear cancellation unit includes a subtraction unit that subtracts said image signals associated with pixel rows of said image acquiring unit that are positioned between said adjacent pixel rows of said image acquiring unit by said estimated smear signals to substantially remove said smear components from said image signals.

17. The apparatus of claim 15 wherein said image acquiring unit includes an electronic image sensor configured to generate sample smear signals that represent said smear components of said image signals.

18. The apparatus of claim 17 wherein said electronic image sensor is configured to generate said image signals and said sample smear signals in parallel.

19. The apparatus of claim 18 wherein said electronic image sensor includes said selected photosensitive pixel rows that are configured to exclusively generate said sample smear signals.

20. The apparatus of claim 19 wherein said selected photosensitive pixel rows of said electronic image sensor are every other pixel rows of said electronic image sensor.

21. The apparatus of claim 17 wherein said electronic image sensor includes a charge coupled device.

22. The apparatus of claim 1 wherein said electronic image sensor is configured to generate a set of said image signals and a set of said sample smear signals in sequence.

23. The apparatus of claim 20 wherein said smear cancellation unit includes a subtraction unit that subtracts said image signals by said sample smear signals to substantially remove said smear components from said image signals.

* * * * *